US010227011B2

United States Patent
Kivelä

(10) Patent No.: US 10,227,011 B2
(45) Date of Patent: Mar. 12, 2019

(54) METHOD, SYSTEM AND COMPUTER PROGRAM PRODUCT FOR CONTROLLING BRAKING OF A MACHINE MOUNTED FOR MOVEMENT ON RAILS

(71) Applicant: Cargotec Finland Oy, Tampere (FI)

(72) Inventor: Timo Kivelä, Nokia (FI)

(73) Assignee: Cargotec Finland Oy, Tampere (FI)

( * ) Notice: Subject to any disclaimer, the term of this patent is extended or adjusted under 35 U.S.C. 154(b) by 208 days.

(21) Appl. No.: 14/901,734

(22) PCT Filed: Jun. 27, 2014

(86) PCT No.: PCT/FI2014/050538
§ 371 (c)(1),
(2) Date: Dec. 29, 2015

(87) PCT Pub. No.: WO2015/001184
PCT Pub. Date: Jan. 8, 2015

(65) Prior Publication Data
US 2016/0152145 A1  Jun. 2, 2016

(30) Foreign Application Priority Data
Jul. 1, 2013 (FI) ...................................... 20135718

(51) Int. Cl.
*B60L 7/26* (2006.01)
*B60L 3/00* (2006.01)
(Continued)

(52) U.S. Cl.
CPC .............. *B60L 7/26* (2013.01); *B60L 3/0015* (2013.01); *B60L 3/0076* (2013.01); *B60L 3/108* (2013.01);
(Continued)

(58) Field of Classification Search
CPC ......... B60L 7/26; B60L 3/0015; B60L 15/002
See application file for complete search history.

(56) References Cited

U.S. PATENT DOCUMENTS

| 5,319,292 A | 6/1994 | Backstrand |
| 5,573,312 A | 11/1996 | Müller et al. |

(Continued)

FOREIGN PATENT DOCUMENTS

| CA | 2359393 A1 | 4/2013 |
| DE | 19510755 A1 | 10/1996 |

(Continued)

OTHER PUBLICATIONS

PCT International Search Report issued in International Application No. PCT/FI2014/050538 dated Nov. 28, 2014, 4 pages.
(Continued)

*Primary Examiner* — Basil T. Jos
(74) *Attorney, Agent, or Firm* — Finnegan, Henderson, Farabow, Garrett & Dunner LLP

(57) ABSTRACT

The invention relates to a method for controlling braking of a machine mounted for movement on rails. The machine is provided with mechanical wheel brakes, electric drive motors for rotating the wheels and a control system for braking. The method comprises the steps of: —monitoring the movement and operations of the machine to detect whether a stop command shall be activated to stop the machine immediately, —switching-on the mechanical wheel brakes to stop the machine if the stop command is activated, and —activating the electric drive motors of the machine simultaneously with the switching-on of the mechanical wheel brakes to rotate the wheels and prevent locking and sliding of wheels on the rails if movement of the machine is detected at the moment of the activation of the stop command. The invention relates also to a system and computer (Continued)

program product for controlling braking of a machine mounted for movement on rails.

9 Claims, 1 Drawing Sheet

(51) Int. Cl.

| | |
|---|---|
| *B60L 15/00* | (2006.01) |
| *B60L 15/20* | (2006.01) |
| *B66C 13/30* | (2006.01) |
| *B60T 13/66* | (2006.01) |
| *B60T 17/22* | (2006.01) |
| *B60L 7/24* | (2006.01) |
| *B60T 13/58* | (2006.01) |
| *B61H 13/34* | (2006.01) |
| *B60L 3/10* | (2006.01) |

(52) U.S. Cl.
CPC ............... *B60L 7/24* (2013.01); *B60L 15/002* (2013.01); *B60L 15/2009* (2013.01); *B60T 13/58* (2013.01); *B60T 13/665* (2013.01); *B60T 17/228* (2013.01); *B61H 13/34* (2013.01); *B66C 13/30* (2013.01); *B60L 2200/26* (2013.01); *B60L 2200/30* (2013.01); *B60L 2200/40* (2013.01); *B60L 2240/80* (2013.01); *Y02T 10/645* (2013.01); *Y02T 10/648* (2013.01); *Y02T 10/72* (2013.01); *Y02T 10/7275* (2013.01)

(56) References Cited

U.S. PATENT DOCUMENTS

| | | |
|---|---|---|
| 2003/0117096 A1 | 6/2003 | Gagnon et al. |
| 2003/0117098 A1 | 6/2003 | Berroth et al. |
| 2011/0029167 A1 | 2/2011 | Itano et al. |
| 2015/0039166 A1* | 2/2015 | Bergmann .......... B60T 8/17616 701/22 |

FOREIGN PATENT DOCUMENTS

| | | |
|---|---|---|
| DE | 10333276 A1 | 2/2005 |
| EP | 0733581 A2 | 9/1996 |
| JP | 2008029109 A | 2/2008 |

OTHER PUBLICATIONS

Search Report issued in Finnish Patent Application No. 20135718 dated Apr. 15, 2014, 1 page.
Office Action for Chinese Patent Application No. CN 201480037766 from the Chinese Patent Office dated Aug. 26, 2016.

* cited by examiner

METHOD, SYSTEM AND COMPUTER PROGRAM PRODUCT FOR CONTROLLING BRAKING OF A MACHINE MOUNTED FOR MOVEMENT ON RAILS

TECHNICAL FIELD

The invention relates to a method, system and a computer program product for controlling braking of a machine mounted for movement on rails, which machine is provided with mechanical wheel brakes, electric drive motors for rotating the wheels and a control system for braking.

TECHNICAL BACKGROUND

International Standard IEC 61800 is relating to properties of adjustable speed electrical power drive systems, thus including rail mounted gantry cranes (RMG), automatic stacking cranes (ASC), ship-to-shore cranes (STS), quay cranes and trolleys used in said cranes. Particularly in the part 5-2 of said Standard are defined the functional safety requirements for said drive systems. In the International Standard IEC 61800-5-2 the stop and brake functions of the adjustable speed electrical power drive systems are defined and divided in categories as follows:

Stop category 0: An uncontrolled stop in which the stopping is performed by immediate removal of power to the hoisting machine actuators.

Stop category 1: A controlled stop with power available to the hoisting machine actuators. When the stop is achieved power is removed from the actuators.

Stop category 2: A controlled stop with power left available to the hoisting machine actuators.

In stop categories 1 and 2 the braking and stop of the crane and/or trolley will happen in a controlled manner without any major problems. Problems will occur especially in stop category 0 braking which in fact is an emergency braking. This kind of situation happens e.g. when a person is detected in the operating range of an automatic stacking crane (ASC), whereby all operations of the crane are stopped immediately. In this type of braking a mechanical brake is switched on, said brake being always on with a constant torque. Normally the mechanical brake would be used only as a parking brake. Even though this type of braking is not happening according to a normal operating mode, in some circumstances it may occur frequently, e.g. ten times a day.

So a crane or a trolley is a machine running on rails the wheels of which machine will be locked and sliding on the rails during stop category 0 braking. The sliding of the wheels causes wheel damaging. When the wheels are sliding on the rails extremely high temperatures are formed to small areas on wheel surface causing martensitic reaction which weakens the wheel strength. Due to this phenomenon the wheel surface may in worst cases come off, at least partially. Better materials for wheels as well as other mechanical solutions have been searched and examined but current solutions and materials have been found best available at least at the moment.

One prior art braking system is disclosed in U.S. Pat. No. 5,573,312. This document discloses a vehicle having an electric and mechanical braking system with which a braking wheel can be rotated by a motor. The mechanical brake of this system, however, is dynamic so that it does not provide a constant but variable torque. Also the vehicle itself is of a type different from the inventive one and it cannot be seen that this prior art system could be applicable in RMG cranes, especially in ASC cranes.

SUMMARY

The objective of the present invention is to provide a novel and improved method, system and a computer program product for controlling braking of a rail mounted gantry crane. To this end the inventive method is mainly characterized in that it comprises the steps of:

monitoring the movement and operations of the machine to detect whether a stop command shall be activated to stop the machine immediately, switching-on the mechanical wheel brakes to stop the machine if the stop command is activated, and activating the electric drive motors of the machine simultaneously with the switching-on of the mechanical wheel brakes to rotate the wheels and prevent locking and sliding of wheels on the rails if movement of the machine is detected at the moment of the activation of the stop command.

In one embodiment of the method, it comprises monitoring the stopping of the machine and deactivating the electric drive motors of the machine when the machine is standing still.

In a further embodiment of the method, it comprises programming a safety time gap in the control system for braking, said time gap being calculated from the activation of the stop command, and deactivating the electric drive motors of the machine after said safety time gap regardless of the stopping state of the machine.

The inventive system is mainly characterized in that it comprises:

means for monitoring the movement and operations of the machine to detect whether a stop command shall be activated to stop the crane immediately, means for switching-on the mechanical wheel brakes to stop the machine if the stop command is activated, and means for activating the electric drive motors of the machine simultaneously with the switching-on of the mechanical wheel brakes to rotate the wheels and prevent locking and sliding of wheels on the rails if movement of the machine is detected at the moment of the activation of the stop command.

According to one embodiment of the system the means for monitoring the movement and operations of the machine is arranged to monitor the stopping of the machine and deactivate the electric drive motors of the machine when the machine is standing still.

According to another embodiment of the system a safety time gap is programmed in the control system for braking, which time gap is calculated from the activation of the stop command, whereby the electric drive motors of the machine are deactivated after said safety time gap regardless of the stopping state of the machine.

The inventive computer program product comprises a computer readable medium bearing a computer program code embodied therein for use with a computer, and it is mainly characterized in that the computer program code comprises:

code for monitoring the movement and operations of the machine to detect whether a stop command shall be activated to stop the crane immediately, code for switching-on the mechanical wheel brakes to stop the machine if the stop command is activated, and code for activating the electric drive motors of the machine simultaneously with the switching-on of the mechanical wheel brakes to rotate the wheels and prevent locking and sliding of wheels on the rails if movement of the machine is detected at the moment of the activation of the stop command.

According to one aspect the computer program code further comprises code for monitoring the stopping of the machine and deactivating the electric drive motors of the machine when the machine is standing still.

According to another aspect the computer program code further comprises code for programming a safety time gap in the control system for braking, said time gap being calculated from the activation of the stop command, and code for deactivating the electric drive motors of the machine after said safety time gap regardless of the stopping state of the machine.

The term "machine" used in the claims is intended to cover all types of cranes mounted for movement on rails and trolleys used in cranes. Because the invention is also applicable in railway apparatuses and equipment provided with mechanical wheel brakes and electric drive motors, said term "machine" covers this kind of apparatuses and equipment also.

The present invention provides considerable advantages over prior art. The inventive system is a drive assisted braking system (DAB) by which the wheels of the machine, such as a crane or trolley are kept rotating during mechanical braking thus reducing the heating of the wheels and preventing wheel damaging.

Other advantages and characteristic features of the invention are set out below by detailed disclosure of the invention, wherein the invention is described with reference to the figures of the accompanying drawing, to the details of which the invention is not exclusively limited.

DETAILED DESCRIPTION OF PREFERRED EMBODIMENTS

As already explained earlier the present invention is directed to handle and solve the problems relating to the situation in which during normal driving, e.g. when the gantry crane is moved from one position to another the crane and/or the trolley must be stopped immediately. This kind of situation occurs e.g. when a person is detected in the operating range of an automatic stacking crane (ASC), whereby all operations of the crane are stopped immediately. The crane is then stopped by switching on the mechanical brakes. To prevent sliding during mechanical braking rotation of the wheels is assisted with the drive motors of the crane. In practice this means that the stopping ramp for a wheel axle is activated at the same time as the mechanical brakes are applied. So the inventive system and method are purely presenting a computer program product and a programmable way to control the rotation of the crane wheels. The program is running in the PLC of the gantry crane in which the control system of the crane is running.

The stopping ramp for the wheel axle is slightly shorter than the stopping ramp achieved with pure mechanical braking. The reason for this is the fact that so the drive motors will not try to extend the stopping distance. This might cause further some sliding of the wheels but even in that case the wheels will not lock to one position for a long time. This prevents extensive heat accumulation to one small area on the wheel and consequently prevents the martensitic reaction on the wheel surface.

Figure 1:
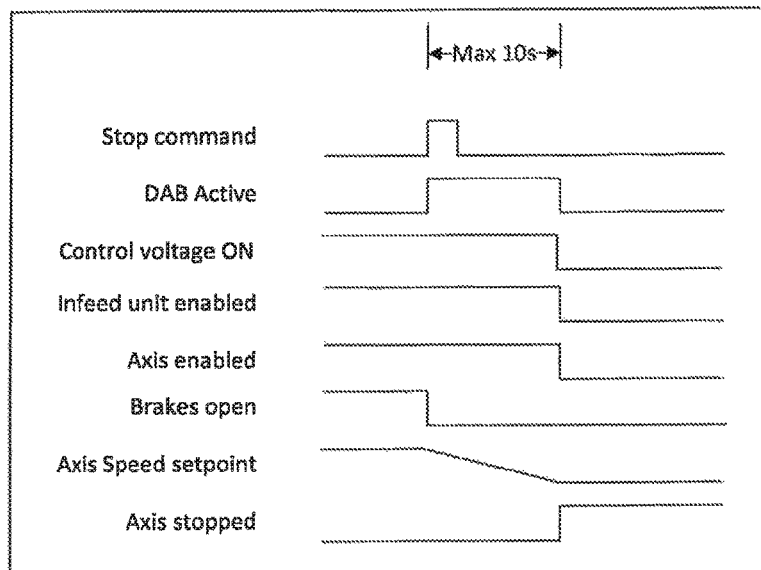
FIG. 1 shows schematically the timing diagram for the activating function of the braking control system when the gantry crane is moving when the stop command is given.
Figure 2:
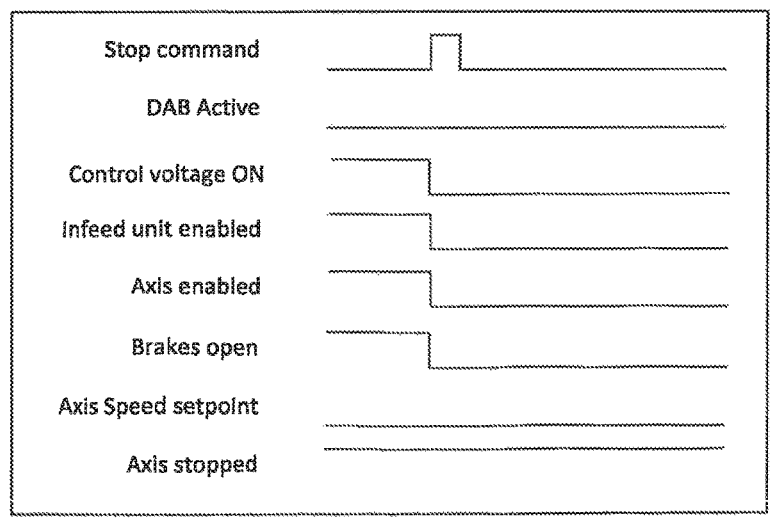
FIG. 2 shows schematically the timing diagram for the activating function of the braking control system when the gantry crane is stopped when the stop command is given.

Now, referring to FIGS. 1 and 2 the activating function of the system is explained in a more detailed manner. The drive assisted braking function (DAB function) is activated only if the gantry crane is moving at the moment when the Stop command is activated. This situation is illustrated by FIG. 1. When the gantry crane is standing still the DAB function is not activated. This is illustrated by FIG. 2. In the case when the DAB function is not activated, Axis enable, Infeed unit enable and Control voltage are cut down immediately. With the term "Infeed unit" is preferably meant a semiconductor component which generally is able to feed energy. This is shown in FIG. 2. In case that the gantry crane is moving at the moment of Stop command, Axis and Infeed unit enable as well as Control voltage are kept active as long as the gantry crane is stopping. Gantry crane stopping is monitored and if any difference is noticed the DAB function is deactivated immediately and stopping is continued with mechanical brakes of the gantry crane. Also a safety time gap after which the DAB function is deactivated regardless of stopping state is included in the system. In FIG. 1 said safety time gap is set to 10 seconds. It is however obvious that the safety time gap can be set shorter or longer if needed.

The invention has been described above by way of examples and with reference to the figures of the accompanying drawing. Even though the present invention has above been described more closely in connection with rail mounted cranes, it is to be understood that the invention is applicable in all types of cranes mounted for movement on rails and in trolleys used in cranes. Therefore the invention is not limited merely to the examples illustrated in the figures; instead, different embodiments of the invention may vary within the scope of the inventive idea defined in the accompanying claims.

The invention claimed is:

1. Method for controlling braking of a crane or trolley mounted for movement on rails, which crane or trolley is provided with mechanical wheel brakes, electric drive motors for rotating the wheels and a control system for braking, characterized in that the method comprises the steps of:

monitoring the movement and operations of the crane or trolley to detect whether a stop command shall be activated to stop the crane or trolley immediately, switching-on the mechanical wheel brakes to stop the crane or trolley if the stop command is activated, and activating the electric drive motors of the crane or trolley simultaneously with the switching-on of the mechanical wheel brakes to rotate the wheels and prevent locking and sliding of wheels on the rails if movement of the crane or trolley is detected at the moment of the activation of the stop command.

2. Method for controlling braking of the crane or trolley mounted for movement on rails as claimed in claim 1, characterized by monitoring the stopping of the crane or trolley and deactivating the electric drive motors of the crane or trolley when the crane or trolley is standing still.

3. Method for controlling braking of the crane or trolley mounted for movement on rails as claimed in claim 1 or 2, characterized by programming a safety time gap in the control system for braking, said time gap being calculated from the activation of the stop command, and deactivating the electric drive motors of the crane or trolley after said safety time gap regardless of the stopping state of the crane or trolley.

4. A system for controlling braking of a crane or trolley mounted for movement on rails, which crane or trolley is provided with mechanical wheel brakes, electric drive motors for rotating the wheels and a control system for braking, characterized in that the system for controlling braking comprises:

means for monitoring the movement and operations of the crane or trolley to detect whether a stop command shall be activated to stop the crane or trolley immediately;

means for switching-on the mechanical wheel brakes to stop the crane or trolley if the stop command is activated, and means for activating the electric drive motors of the crane or trolley simultaneously with the switching-on of the mechanical wheel brakes to rotate the wheels and prevent locking and sliding of wheels on the rails if movement of the crane or trolley is detected at the moment of the activation of the stop command.

5. A system for controlling braking of the crane or trolley mounted for movement on rails as claimed in claim 4, characterized in that the means for monitoring the movement and operations of the crane or trolley is arranged to monitor the stopping of the crane or trolley and deactivate the electric drive motors of the crane or trolley when the crane or trolley is standing still.

6. A system for controlling braking of the crane or trolley mounted for movement on rails as claimed in claim 4 or 5, characterized in that a safety time gap is programmed in the control system for braking, which time gap is calculated from the activation of the stop command, whereby the electric drive motors of the crane or trolley are deactivated after said safety time gap regardless of the stopping state of the crane or trolley.

7. A non-transitory computer-readable medium containing instructions that, when executed by at least one processor, cause a system to perform operations controlling braking of a crane or trolley mounted for movement on rails, which crane or trolley is provided with mechanical wheel brakes, electric drive motors for rotating the wheels and a control system for braking, the operations comprising:

monitoring the movement and operations of the crane or trolley to detect whether a stop command shall be activated to stop the crane or trolley immediately, switching-on the mechanical wheel brakes to stop the crane or trolley if the stop command is activated, and activating the electric drive motors of the crane or trolley simultaneously with the switching-on of the mechanical wheel brakes to rotate the wheels and prevent locking and sliding of wheels on the rails if movement of the crane or trolley is detected at the moment of the activation of the stop command.

8. The non-transitory computer-readable medium of claim 7, the operations further comprising:

monitoring the stopping of the crane or trolley and deactivating the electric drive motors of the crane or trolley when the crane or trolley is standing still.

9. The non-transitory computer-readable medium of claim 7 or 8, the operations further comprising:

programming a safety time gap in the control system for braking, said time gap being calculated from the activation of the stop command, and deactivating the electric drive motors of the crane or trolley after said safety time gap regardless of the stopping state of the crane or trolley.

* * * * *